United States Patent [19]

Snowdon

[11] 4,137,935
[45] Feb. 6, 1979

[54] VALVE ASSEMBLY

[75] Inventor: Brian Snowdon, Doncaster, England

[73] Assignee: Macawber Engineering Limited, Doncaster, England

[21] Appl. No.: 840,377

[22] Filed: Oct. 7, 1977

Related U.S. Application Data

[63] Continuation-in-part of Ser. No. 659,031, Feb. 18, 1976, abandoned.

[30] Foreign Application Priority Data

Feb. 11, 1976 [GB] United Kingdom ............... 5380/76

[51] Int. Cl.$^2$ ............................................. F16K 3/36
[52] U.S. Cl. ................................ 137/242; 251/144; 251/172; 251/298
[58] Field of Search ............... 137/242; 251/144, 172, 251/173, 298; 220/252; 222/105, 556

[56] References Cited

U.S. PATENT DOCUMENTS

| 1,901,961 | 3/1933 | Grant | 251/159 |
|---|---|---|---|
| 3,051,189 | 8/1962 | Pro | 137/242 |
| 3,272,474 | 9/1966 | Pro | 251/144 X |
| 3,528,448 | 9/1970 | Urban | 137/242 |
| 3,601,511 | 8/1971 | Massenback | 251/172 X |
| 3,638,674 | 2/1972 | Forst | 251/173 X |
| 4,074,889 | 2/1978 | Engel | 251/298 |

Primary Examiner—Harold W. Weakley
Attorney, Agent, or Firm—Stevens, Davis, Miller & Mosher

[57] ABSTRACT

A valve assembly for closing and sealing an inlet which is full of large granular dry material including a dome-like valve member mounted for rotation to open or close the inlet and a deformable resilient sealing ring which may be inflated by gas pressure to engage the valve member in its closed position to produce a gas-tight seal across the valve member, the sealing ring being arranged within the valve assembly to minimize abrasive wear on the ring from the granular material.

6 Claims, 7 Drawing Figures

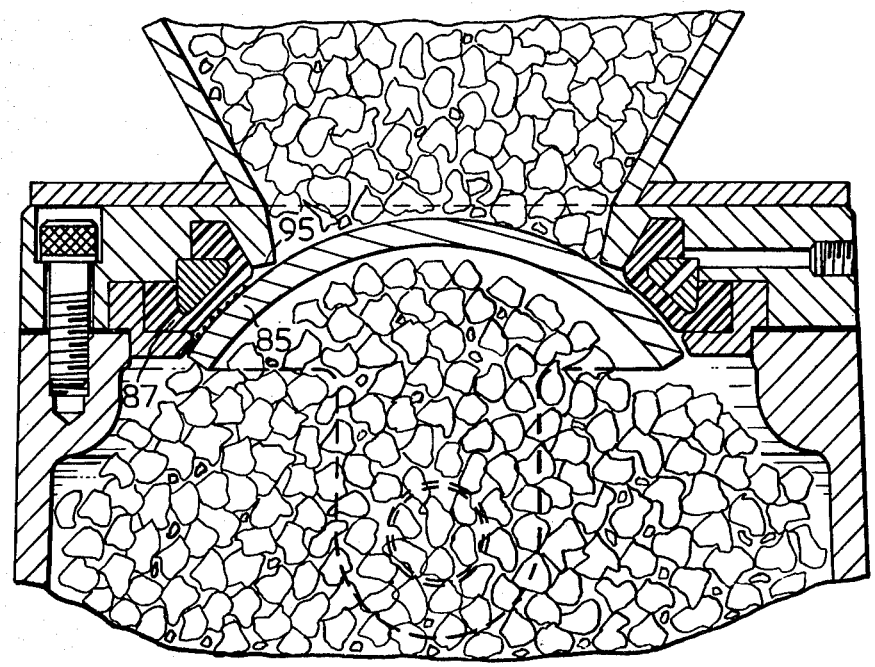
—F I G.6.—
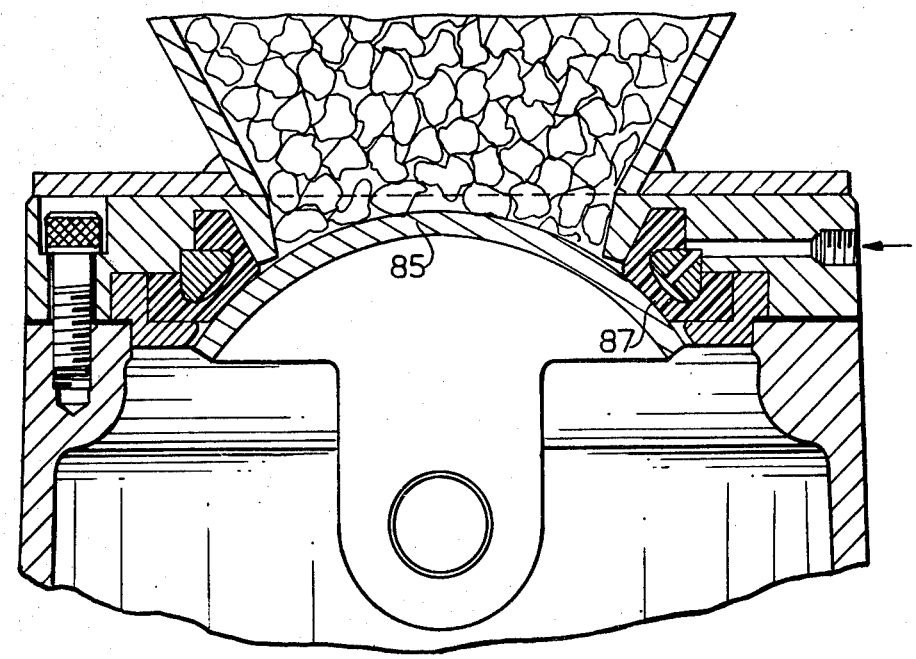
—F I G.7.—

VALVE ASSEMBLY

This application is a continuation in part of application Ser. No. 659,031 filed 18th Feb. 1976 now abandoned.

This invention relates to valve assemblies and in particular to valve assemblies for controlling the movement of flowable, solid or partly solid material in bulk, especially large, granular, dry material. Such material may be required to be moved from one point to another, for instance, along a pipeline to a processing plant for the material. At some position it may be desirable to interrupt the flow of material, for instance, at the point where the material is required to enter a pressure vessel for subsequent pneumatic conveying or processing of the material within the pressure vessel.

In order to interrupt the flow of material and/or to seal a pressure vessel or other equipment from the pipeline or other structive along which the material is being delivered, a valve assembly may be incorporated in the flow path of the material, for instance, between a pressure vessel and a pipeline or supply hopper. However, where the bulk material includes large, hard particles, particularly abrasive particles, it has not previously been possible to close and at the same time seal an aperture because these large particles obstruct the movement of the valve member or prevent the sealing of the valve member against the valve body when the valve member is in its closed position. Accordingly it has been necessary to provide two separate valves, the first valve stopping the supply of the material and the second valve, provided downstream from the first valve, achieving an airtight seal across an aperture at which no material is present.

According to the present invention there is provided a valve assembly for closing and sealing an inlet which is full of large, granular, dry material, the valve comprising a housing defining the inlet and defining an outlet, the ratio of the outlet diameter to the inlet diameter being at least 1.5:1 thereby allowing unrestricted flow of large granular material through the housing, a closure member having the shape of a part of a spherical shell and being mounted for rotation between a first position in which the inlet is open and a second position in which the inlet is closed, the axis of rotation passing through the centre of the sphere of which the closure member forms a part, said centre lying close to the outlet whereby the ratio of the distance between the outlet and inlet of the valve to the inlet diameter is less than 1.5:1, said housing also defining an annular recess, a deformable, resilient sealing ring being mounted in said recess, and secured to the defining surface of said recess except at a central portion thereof to prevent sliding movement of the sealing ring relative to the recess, means for supplying gas under pressure to said central portion of said recess so that gas supplied to said recess while the closure member is in its second position causes the centre of the sealing ring to deform out of the recess into engagement with the convex surface of the closure member to provide a gas-tight seal across the inlet, the sealing ring being sufficiently resilient to retract into the recess on release of gas pressure, and the housing having a shearing edge around the inlet which cooperates with a shearing edge provided on the closure member to shear granules of material located between said edges, the clearance between said edges being less than the clearance between the retracted sealing ring and the closure member to ensure that granules between the closure member and the sealing ring are not large enough to cause wear of the sealing ring, the sealing ring being sufficiently deformable to deform around any granules lodged between the sealing ring and the closure member to ensure said gas-tight seal.

The provision of the closure member in the form of a part of a spherical shell (dome shaped) rotatable about its spherical axis allows the closure member to be made of a robust construction so that it may be driven through a column of material which may include large particles of hard, abrasive material.

The provision of a relatively large outlet compared with the inlet helps to ensure that, when the valve is open, an unrestricted flow of material is possible through the housing of the valve assembly. The arrangement is preferably such that the closure member rotates through 90° from its first to second position and in its second position is positioned to one side of the flow path of material so that it does not obstruct the flow.

The position of the sealing ring is such that, when the valve is in its open position, the sealing ring is not exposed to the abrasive effect of particles of material passing through the valve. This is because it is arranged to act on the convex surface of the closure member and is therefore positioned so that its sealing surface faces from the inlet region of the valve downwardly towards the shaft on which the closure member is mounted. Accordingly material flowing through the valve will pass the sealing ring but will not tend to contact it. Indeed the valve can be used over a considerable period of time without any wear of the sealing ring.

Preferably the ratio of the outlet diameter to the inlet diameter is about 2:1.

The shaft on which the closure member is mounted is positioned as close as possible to the outlet in order to reduce the total height of the valve assembly. By mounting the shaft close to the outlet the closure member will, in its second position, lie at least partly below the level of the outlet. For instance the valve assembly may be mounted on top of a pneumatic conveying pressure vessel and when the valve is in its open position a part of the closure member may lie within the top of the pressure vessel. Preferably the ratio of the distance between the outlet and inlet of the valve to the inlet diameter is about 1.3:1.

The sealing ring is secured to the defining surface of the recess located in the housing so that the sealing ring does not slide within the recess, thus preventing the ingress of particles of material which would otherwise find their way between the sealing ring and the supporting housing and cause rapid deterioration of the ring. Rather, in the case of the present invention, the sealing ring is located within the recess when the closure member is in its open position and is moved into engagement with the closure member when the latter is in its closed position only by a central deformation of the sealing ring out of the recess. In its undeformed condition the sealing ring lies within the recess and this further protects the sealing ring from the wearing effect of abrasive particles.

A valve assembly in accordance with the present invention is constructed so that any particles which find their way between the closure member and the sealing ring do not exert an abrasive effect on the sealing ring and do not unduly affect the efficiency of the airtight seal provided by the sealing ring. Thus large particles which are located in the path of movement of the closure member as it moves to its closed position tend to be sheared between the shearing edges of the closure member and the housing. The clearance between the closure member and the housing is minimal and therefore only small particles can find their way between the sealing ring and the closure member. The clearance therebetween is greater than the clearance between the above mentioned shearing edges, so that any particles between the sealing ring and the closure member are "loose" in this region and hence are not able to cause any wear of the sealing ring. Preferably the clearance between the said shearing edges is about half the clearance between the retracted sealing ring and the closure member.

The material of the sealing ring is such that it will easily deform about any small particles located between the sealing ring and the closure member so that when pressure is applied to the sealing ring the efficiency of the seal is not impaired by these particles.

When the sealing ring is in its retracted position there is preferably no cavity or air gap behind the sealing ring other than that provided by a conduit along which pressurized gas is supplied to move the centre of the sealing ring. Accordingly the movement of the centre of the sealing ring is from its retracted position, supported along its sides and behind the ring by the housing to its "inflated" position where the central portion of the ring is moved outwardly. The sealing ring is made of sufficiently resilient material so that when the air pressure is released it will move under its own resilience to its retracted position. Such an arrangement has the advantage that the amount of movement of the sealing ring between its retracted and inflated positions is relatively small and insufficient to allow a build-up of particles on top of the retracted sealing ring. Such a build-up of particles would prevent the ring from operating properly when the valve is closed. This arrangement is much more effective than one where the sealing ring has a cavity or air gap into which it retracts, possibly with the application of negative pressure. Furthermore this arrangement allows the sealing ring to be made of a material which is a very soft and resilient type of rubber, for instance, one of the Neoprene rubbers which will readily deform round the smaller particles which are located between the closure member and the sealing ring, as mentioned above.

Accordingly a valve assembly in accordance with the present invention incorporates several features which enable only a single valve to be used for closing off a head of large dry granular material. Furthermore only a single sealing ring is provided with the valve, this sealing ring being such that a very effective airtight seal can be maintained across the valve when it is in its closed position. Thus the requirement for only one valve and only a single ring allows a very compact valve to be provided with a relatively small height to inlet diameter ratio. This has the great advantage that the head room required for installing an effective valve is relatively small.

An embodiment of the invention will now be described by way of example only, with reference to the accompanying drawings, in which:

FIGS. 4 to 7 show a valve assembly according to the present invention in various stages of its operation.

Figure 1:
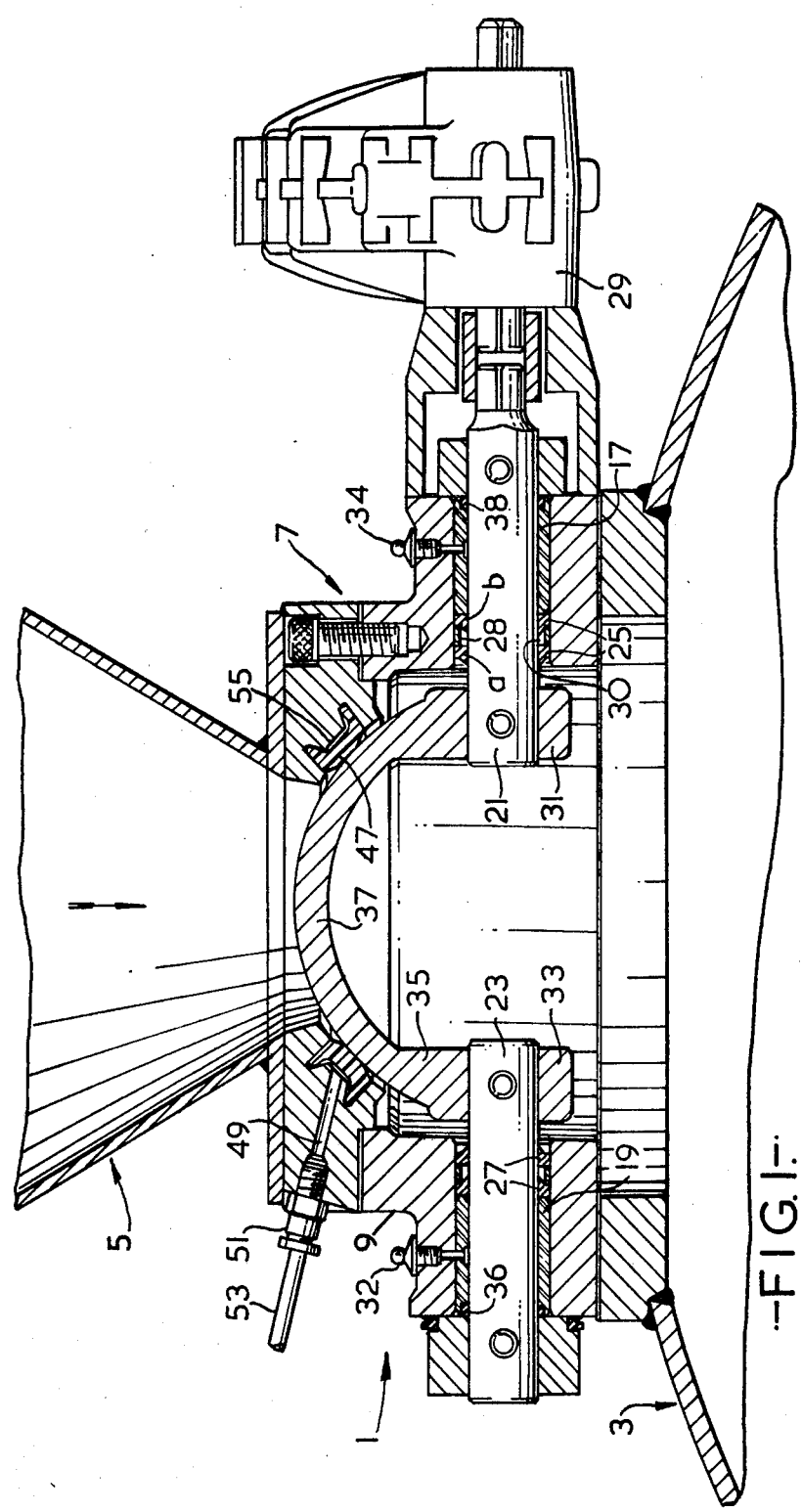
FIG. 1 is a view of a valve assembly, mainly in a vertical section.

Referring to the drawings, a valve assembly 1 is mounted between a pressure-vessel 3 and a material supply hopper 5. Only the top of the pressure-vessel 3 is shown in the drawings but the pressure-vessel also includes a material outlet and means for supplying compressed air to the interior of the vessel. Material may be delivered from hopper 5 to pressure-vessel 3 and then expelled therefrom by means of compressed air.

Valve assembly 1 includes a valve housing 7 defining an aperture throught which material passes between hopper 5 and pressure-vessel 3. The housing 7 includes a substantially circular cylindrical wall 9 bolted to a ring 11 on the top of pressure-vessel 3 and, bolted to the top wall 9, a top plate 12, having a circular aperture 13 therein, and attached in turn to the flanged bottom 15 of hopper 5.

As seen best in FIG. 1, wall 9 of valve assembly 1 includes diametrically oppositely disposed bearing arrangements 17 and 19 for a drive shaft 21 and a pivot shaft 23 respectively. Bearing arrangements 17 and 19 include pairs of gas-tight seals 25 and 27. The design of these seals is such as to protect the shafts 21 and 23 against the internal pressure and the material contained within the valve assembly. Thus each pair of seals 25 and 27 comprises two identical sealing rings a and b which are fitted with their sealing lip directed towards the centre of the valve assembly. Between rings a and b a spacing ring 28 is fitted so that there is a cavity 30 between the sealing rings. This cavity is packed with grease during assembly of the valve. Due to rotation of the shafts 21 and 23 during operation of the device, fine abrasive material will eventually pass beneath the sealing lip of the first seal a. This material mixes with the grease but, because of its "wet" nature, will not pass beneath the lip of the second seal b. To prevent the mixture of abrasive material and grease from eventually "drying up" grease is periodically pumped via grease points 32 and 34 into slots in the bearings and is forced by the pressure exerted in the grease guns beneath the sealing lips of the outer seals b into the cavity between the seals, pushing the contaminated grease under the lip of the inner seals a to the inside of the valve assembly. The O rings 36 and 38, fitted in recesses in the outer faces of the bearings, are provided to force the grease to travel towards the centre of the valve.

Drive shaft 21 extends outwardly beyond bearing arrangement 17 to an external drive motor 29. Both drive shaft 21 and pivot shaft 23 extend a short distance inwardly of the inner surface of wall 9. The inward ends of drive shaft 21 and pivot shaft 23 are each attached to a respective downwardly depending portion 31, 33 of a valve member 35. Integral with portions 31 and 33 is a closure member 37 which has the shape of a spherical shell. The arrangement is such that the common axis of shafts 23 and 23 passes through the centre of the spherical shell of which closure member 37 forms a part. Rotation of drive shaft 21 by means of motor 29 causes closure member 37 to move from its closed position (shown in full lines in FIG. 2) to its open position (shown in dotted lines in FIG. 2). Accordingly the closure member rotates through 90° between its closed and open positions. The arrangement of the drive and pivot shafts relative to the valve member and the degree of movement of the valve member means that, when the closure member is in its open position, the path of movement for material passing between hopper 5 and pressure-vessel 3 is entirely unrestricted by the closure member or its driving arrangement.

When the pressure-vessel is being filled with material, the valve member 35 will of course be in its open position. When it is desired to close aperture 13, the aperture will normally be full of bulk material. During the closing movement the leading edge 39 of closure member 37 slices through the column of bulk material. Towards the end of its path of movement leading edge 39 moves past a fixed rigid edge 41 formed on top plate 12. Any large particles of material present in the path of movement of closure member 37 will be pushed out of the way by leading edge 39, or else trapped and sheared between cutting edge 41 of top plate 12 and leading edge 39 of closure member 37.

Top plate 12 of valve assembly 1 includes an annular surface 43 which is contoured to match the curvature of closure member 37 and when the latter is in its closed position curved surface 43 lies closely adjacent the convex surface of closure member 37. An annular recess 45 is formed in surface 43 and located in recess 45 is an annular ring 47. Ring 47 is bonded to the walls of recess 45 except at a central portion thereof. Ring 47 is made of a flexible and resilient hard wearing material.

Located within top plate 12 of valve assembly 1 is a bore 49 which opens at one end into recess 45 at the central portion thereof and at the other end leads to a connector 51 attached to the exterior of plate 12. Extending from connector 51 is a pipe 53 along which may be supplied compressed air.

When closure member 37 is in its closed position, compressed air may be supplied along bore 49 to annular ring 47 at that side remote from closure member 37. The compressed air will then urge ring 37 into sealing contact with closure member 37. The arrangement is such that compressed air will fill the whole of a small annular space 55 behind ring 47 so as to press ring 47 against closure member 37 along the entire length of ring 47.

The surface of annular ring 47 which engages closure member 37 has a width such that any small particles which are trapped between ring 47 and closure member 37 will be entirely enclosed and will not affect the efficiency of the seal between the ring and closure member.

It will be appreciated that, provided the air pressure in space 55 is greater than the pressure difference across the closure member 37, then a gas-tight seal will be maintained across the aperture.

Figure 2:
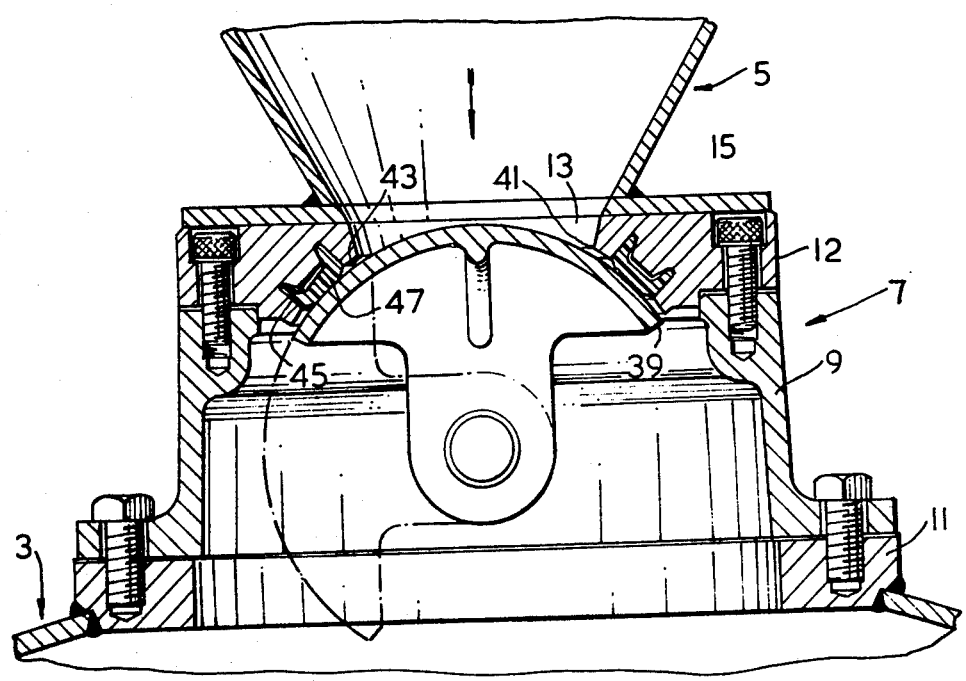
FIG. 2 is another view of the valve assembly of FIG. 1 in a vertical section at right angles to that of FIG. 1.
Figure 3:
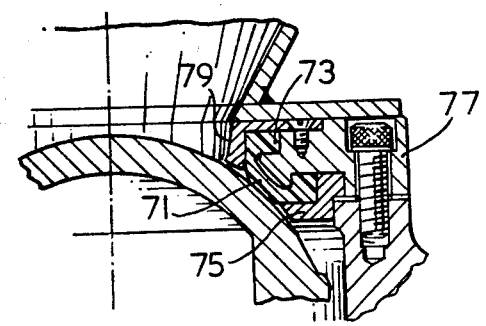
FIG. 3 is a view similar to that of part of FIG. 1 but showing a modified sealing arrangement.

Referring to FIG. 3 an alternative sealing arrangement includes a sealing ring 71 which is provided with large ear portions 73. Sealing ring 71 is not bonded to the valve body as in the case of the sealing ring of FIG. 1 but instead ear portions 75 are trapped within recesses formed by an assembly of rings 75, 77 and 79 which together form a sealing head corresponding to top plate 12 of the arrangement shown in FIGS. 1 and 2. An advantage of this "loose seal" arrangement over the "bonded" arrangement is that a larger range of elastomers or rubbers can be used for the former so that a wide choice of seal materials is available to suit the materials being handled or the temperature during operation of the device.

In FIGS. 1 to 3 the sealing ring is shown in its "inflated" position.

FIGS. 4 to 7 show a valve assembly in accordance with the present invention in various stages of operation.

Figure 4:
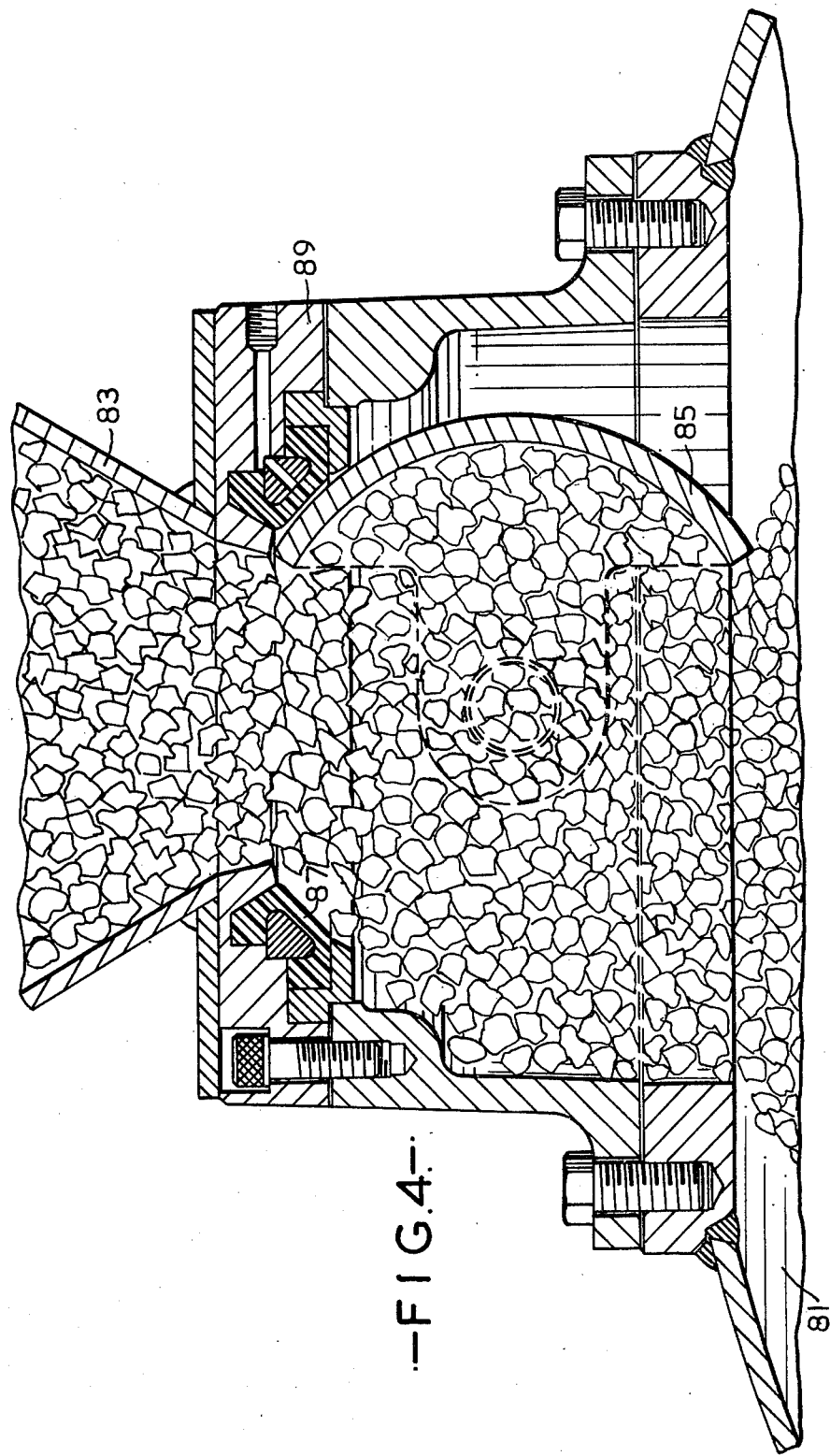

In FIG. 4 the valve is in its open position allowing the pressure-vessel 81 to be filled with material (granular material such as coal or ash) from hopper 83. It can be seen that the closure member 85 does not significantly obstruct the flow of material through the valve assembly and the sealing ring 87, positioned on the underside of top ring 89 of the sealing head, is not in the path of the flowing material and is therefore not subject to abrasive wear from the material. The sealing ring 87 is in its retracted position where it is supported over its entire surface area by the element of top ring 89 except that region of the sealing ring which is for engagement with closure member 85.

Figure 5:
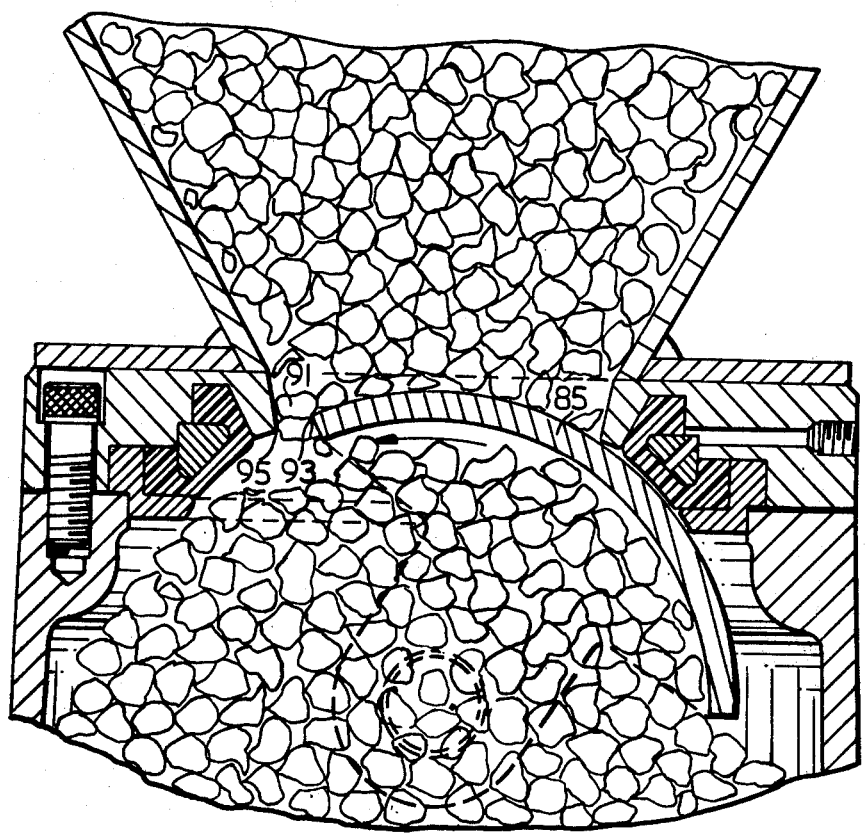

FIG. 5 shows the closure member in the process of moving to its closed position. It can be seen that large granules such as granule 91 are sheared between the shearing edge 93 of closure member 85 and the corresponding shearing edge 95 of top ring 89.

FIG. 6 shows the valve assembly with the closure member having just moved to its closed position. The clearance between shearing edge 95 of top ring 89 and the closure member is about half the clearance between the sealing ring 87 and the closure member 85. Accordingly small particles located between the sealing ring 87 and closure member 85 are "loose" and do not scrape the sealing ring as the closure member moves past it.

The last stage of the operation of the closing of the valve is the application of air pressure behind the sealing ring. The result is illustrated in FIG. 7 the sealing ring having been "inflated" so that the central portion thereof engages with closure member 85. It can be seen that the sealing ring 87 has deformed around any small particles which were located between the sealing ring and the closure member.

Subsequent release of air pressure behind the sealing ring allows the sealing ring to retract to its original position due to its own resilience. The amount of movement by the central portion of the sealing ring is however quite small and thus there is no possibility of a build-up of particles between closure member 85 and sealing ring 87. Subsequently closure member 85 is rotated to the position shown in FIG. 1 and further material can flow through the valve assembly into the pressure-vessel 81.

What we claim is:

1. A valve assembly for closing and sealing an inlet which is full of large, granular, dry material, the valve comprising a housing defining the inlet and defining an outlet, the ratio of the outlet diameter to the inlet diameter being at least 1.5:1 thereby allowing unrestricted flow of large granular material through the housing, a closure member having the shape of a part of a spherical shell and being mounted for rotation between a first position in which the inlet is open and a second position in which the inlet is closed, the axis of rotation passing through the centre of the sphere of which the closure member forms a part, said centre lying close to the outlet whereby the ratio of the distance between the outlet and inlet of the valve to the inlet diameter is less than 1.5:1, said housing also defining an annular recess, a deformable, resilient sealing ring being mounted in said recess and secured to the defining surface of said recess except at a central portion thereof to prevent sliding movement of the sealing ring relative to the recess, means for supplying gas under pressure to said central portion of said recess so that gas supplied to said recess while the closure member is in its second position causes the centre of the sealing ring to deform out of the recess into engagement with the convex surface of the closure member to provide a gas-tight seal across the inlet, the sealing ring being sufficiently resilient to retract into the recess on release of gas pressure, and the housing having a shearing edge around the inlet which cooperates with a shearing edge provided on the closure member to shear granules of material located between said edges, the clearance between said edges being less than the clearance between the retracted sealing ring and the closure member to ensure that granules between the closure member and the sealing ring are not large enough to cause wear of the sealing ring, the sealing ring being sufficiently deformable to deform around any of the granules lodged between the sealing ring and the closure member to ensure said gas-tight seal.

2. A valve assembly according to claim 1 wherein the ratio of the outlet diameter to the inlet diameter is about 2:1.

3. A valve assembly according to claim 1 wherein the ratio of the distance between the outlet and inlet of the valve to the inlet diameter is about 1.3:1.

4. A valve assembly according to claim 1 wherein the clearance between said shearing edges is about half the clearance between the retracted sealing ring and the closure member.

5. A valve assembly according to claim 1 wherein the closure member is mounted such that a rotation through 90° is necessary to move the closure member from the first to the second position.

6. A valve assembly according to claim 1 wherein the sealing ring is mounted so that it is supported, in its retracted position around its entire surface by the housing, except in the region which is to engage with the closure member.